United States Patent [19]

Bruson

[11] 3,917,686
[45] Nov. 4, 1975

[54] METHOD FOR PRODUCING CITRIC ACID AND CITRATES

[75] Inventor: Herman Alexander Bruson, Woodbridge, Conn.

[73] Assignee: Bjorksten Research Laboratories, Inc., Madison, Wis.

[22] Filed: Oct. 7, 1974

[21] Appl. No.: 512,247

[52] U.S. Cl. ........... 260/535 P; 260/465.4; 260/483
[51] Int. Cl.² ........................................ C07C 59/16
[58] Field of Search ....................... 260/535 P, 483

[56] References Cited
UNITED STATES PATENTS

| | | | |
|---|---|---|---|
| 3,769,337 | 10/1973 | Wiegand | 260/535 P |
| 3,769,338 | 10/1973 | Dagani | 260/535 P |
| 3,769,351 | 10/1973 | Mukai | 260/611 A |

*Primary Examiner*—Anton H. Sutto
*Assistant Examiner*—Paul J. Killos

[57] ABSTRACT

Citric acid is prepared in a process consisting essentially of the following steps:

1.

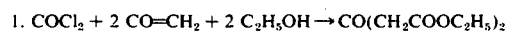

2.

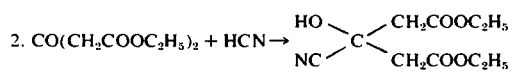

3.

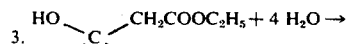

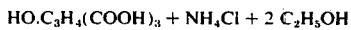

The first step is improved by carrying out the reaction in the presence of a solvent selected from high boiling esters of polybasic acids, which remain liquid at the reaction temperature of −10 to +25°C.

3 Claims, No Drawings

METHOD FOR PRODUCING CITRIC ACID AND CITRATES

BACKGROUND AND PRIOR ART

Citric acid is now being prepared industrially by fermentation, or by separation from citrus fruit juices.

Processes for making citric acid by direct organic synthesis have been disclosed in the literature, but none of these is known to have been practiced on more than a laboratory scale. Relevant are U.S. Pat. No. 3,770,796; 3,773,821; 3,769,351 and German Pat. No. 562,390. None of these patents sets forth the invention here disclosed and claimed.

OBJECTS OF THE INVENTION

An improvement in the art of preparing citric acid by synthetic organic methods.

An improvement in the process step of reacting phosgene and ketene to form acetone carboxylic acid or a derivative thereof.

Further objects will become apparent as the following detailed description proceeds.

BRIEF STATEMENT OF THE INVENTION

Citric acid is prepared by a three-step process which consists substantially of the following reactions:

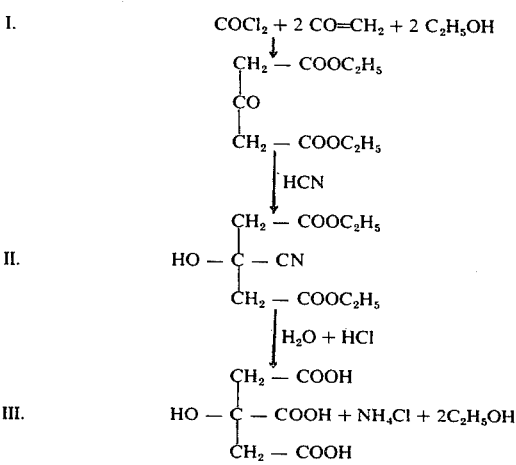

According to the present improvement, step 1, is carried out in the presence of an inert non carcinogenic solvent which is an ester of a polybasic acid, which boils above 255°C and is liquid at 25°C.

DETAILED STATEMENT OF THE INVENTION

The invention is illustrated by the following examples, which are given to provide specific instances of its application, without intent to limit the invention thereto:

EXAMPLE 1

350 grams of di-n-butyl-ortho phthalate was charged to a cylindrical glass reaction vessel equipped with a fritted glass gas inlet tube. The reactor and its contents were cooled to 0° to 5°C in an ice bath and the reactor was equipped with a condenser cooled to −15°C by a brine solution.

1 mole of phosgene (determined by weight increase) was dissolved in the di-n-butyl-ortho phthalate and then while maintaining the temperature at 0° to 5°C, 4 moles of ketene (determined by weight increase) were added to the reaction.

The ketene was generated by the pyrolysis of acetone using the williams-Hurd apparatus, which consists essentially of a glass vessel in which acetone is being refluxed, and which contains in the vapor space a nichrome spiral, kept glowing by the passage of electric current. The resultant ketene (accompanied by by-product methane) is passed through two 80 cm spiral glass condensers cooled to −15°C with circulating brine, to remove as much of the acetone in the gas stream as possible. Then this gas stream is passed through a trap cooled in a mixture of acetone and solid CO2 at −70°C to eliminate as much of the still remaining acetone as possible, whereafter it was led into the solution of phosgene in dibutyl phthalate as stated above.

When all of the ketene had been added, the reactor was equipped with a dropping funnel and 7 moles of ethyl alcohol were added dropwise at such a rate that the temperature remained at less than 30°C. The addition funnel was replaced by a standard reflux condenser and the mixture was heated at reflux for 1 hour.

The unreacted alcohol and other low boilers were flashed off on a rotary evaporator heated by a hot water bath and then the mixture was distilled under vacuum to yield 104 grams of diethyl 1,3-acetone-dicarboxylate.

To a stirred reactor equipped with an efficient condenser and a dropping funnel was charged 1 mole of the diethyl acetone dicarboxylate and 0.5% (by weight) of triethylenediamine. The mixture was cooled in an ice bath to 10° to 15°C and then 1.1 mole of anhydrous HCN was added dropwise over a 20 minute period. The mixture was stirred at 10° to 15°C for 2 hours and then allowed to stand over night at room temperature.

The next day 1.5 moles of hydrochloric acid (as a 20% solution in water) was added to the mixture and it was refluxed for 12 hours.

The excess alcohol was flashed off in a rotary evaporator heated by a hot water bath and then the citric acid was extracted from the NH4Cl with acetone. Evaporation of the acetone yielded 149 grams of citric acid.

To prepare sodium citrate from the citric acid thus obtained, 1 mole of the citric acid was slowly added to a solution of 3 moles of NaOH in 250 mls of H2O. The solution was decolorized by treating with activated charcoal, filtered and placed in large glass trays to evaporate. In a very short time pure trisodium citrate crystallized out and was recovered by filtration. The filtrate was recycled to yield additional product. The total yield of pure trisodium citrate was 280 grams on the citric acid.

EXAMPLE 2

350 grams of tricresyl phosphate was charged to a cylindrical glass reaction vessel equipped with a fritted glass gas inlet tube. The reactor and its contents were cooled to 0 to 5°C in an ice bath and the reactor was equipped with a condenser cooled to −15°C by a brine solution.

1 mole of phosgene (determined by weight increase) was dissolved in the tri cresyl phosphate and then while maintaining the temperature at 0° to 5°C, 4 moles of ketene (determined by weight increase) were added to the reaction as in Example 1.

When all of the ketene had been added, the reactor was equipped with a dropping funnel and 7 moles of ethyl alcohol were added dropwise at such a rate that the temperature remained at less than 30°C. The addition funnel was replaced by a standard reflux condenser and the mixture was heated at reflux for 1 hour.

The unreacted alcohol and other low boilers were flashed off on a rotary evaporator heated by a hot water bath and then the mixture was distilled under vacuum to yield 104 grams of diethyl 1,3-acetone-dicarboxylate.

To a stirred reactor equipped with an efficient condenser and a dropping funnel was charged 1 mole of the diethyl acetone dicarboxylate and 0.5% (by weight) of triethylenediamine. The mixture was cooled in an ice bath to 10° to 15°C and the 1.1 mole of anhydrous HCN was added dropwise over a 20 minute period. The mixture was stirred at 10° to 15°C for 2 hours and then allowed to stand over night at room temperature.

The next day 1.5 moles of hydrochloric acid (as a 20% solution in water) was added to the mixture and it was refluxed for 12 hours.

The excess alcohol was flashed off in a rotary evaporator heated by a hot water bath and then the citric acid was extracted from the $NH_4Cl$ with acetone. Evaporation of the acetone yielded 147 grams of citric acid.

1 mole of the citric acid was slowly added to 3 moles of a solution of 3 moles of NaOH in 250 mls of H2O. The solution was decolorized by treating with activated charcoal, filtered and placed in large glass trays to evaporate. In a very short time pure trisodium citrate crystallized out and was recovered by filtration. The filtrate was recycled to yield additional product. The total yield of pure trisodium citrate was 280 grams.

In this reaction, the reactants should be anhydrous. The ketene employed should be as pure as practically possible, acetone in excess of about 2% is particularly objectionable as it reduces the yield. I prefer to use a ratio for ketene:phosgene in the range pf 2.2 to 3 moles of ketene for each mole of phosgene. The ketene can be generated by the pyrolysis of acetone, acetic acid, diketene or acetic anhydride by methods well known in the art. The resultant ketene is preferably passed through a refrigerated zone for the removal of higher boiling impurities or reactants.

In this process the final yield of citric acid depends almost entirely on the yield of acetone dicarboxylic ester and/or its ester from reaction 1.This yield in turn depends critically on the solvent employed as the medium in which ketene and phosgene reacted.

While in the examples the specific solvents have been mentioned, I may use other inert solvents exemplified by any of the various $C_1$ to $C_6$ alkyl or aryl esters of ortho phthalic acid, sebacic acid, azelaic acid, adipic acid, phosphoric acids, advantageously di-n-butyl-ortho phthalate, di-2-ethylhexyl-ortho-phthalate, di-n-butyl azaleate, di-isooctyl sebacate, di-isopropyl-ortho phthalate, tri-isooctyl phosphate, tricresyl phosphate (mixed cresyl isomers) di-iso octyl adipate and the like; which do not solidify at the temperatures employed in the reaction and which boil above 255°C. (760 m.m.)

When reaction of the phosgene and ketene in the polybasic acid ester solvent is complete, a lower $C_1$ to $C_3$ alkanol (methanol, ethanol, normal or isopropanol) is added to esterify the 3-oxo-glutaryl dichloride which remains in solution; and reaction is completed by heating to remove hydrogen chloride and any excess alkanol. The 3-oxo-glutaric acid ester is then readily vacuum-distilled from the much higher boiling inert organic solvent without difficulty.

The addition of hydrogen cyanide to the oxo group of the 3-oxo-glutaric acid ester can be carried out by adding a solution of sodium cyanide to the isolated ester followed by acidification with hydrochloric acid or sulfuric acid so that the pH of the solution is 8 to 11 at all times; or by adding hydrogen cyanide gas to the ester in the presence of a catalytic amount of a base such as sodium cyanide, sodium hydroxide, sodium carbonate, or a tertiary amind such as triethylene diamine, ("Dabco").

Hydrolysis of the product to citric acid is advantageously carried out by boiling with aqueous hydrochloric acid or sulfuric acid.

As pointed out above, it is important that the ketene used be pure. Working with a laboratory ketene generator with only partial control of the purity, we could not prevent a leakage of some acetone past the cold traps into the gas stream. This reduced our yields approximately 20% judging from the fact that we consistently obtained 20% lower yields than U.S. Pat. No. 3,773,821 using the same solvents under identical conditions excepting the purer grade of ketene used in said patent. The relative yields using the various solvents, however, were the same.

The following table shows the yields obtained. The procedure was that of Example 1, with the sole exception that the solvent was varied a shown.

| SOLVENT | % YIELD OF $C_2H_5OOC-CH_2-CO-CH_2-COOC_2H_5$ (REDISTILLED) |
| --- | --- |
| Dioxane | 43.4 |
| Tricresyl phosphate | 51.4 |
| Dibutyl phthalate | 51.5 |
| Cellosolve acetate | 34.1 |
| Dioctyl adipate | 33.8 *See foot-note |
| Diethyl phthalate | 32.2 *See foot-note |
| Dioctyl phthalate | 30.8 |
| Methyl formate | 28.3 |
| Ethyl benzoate | 24.6 |
| Chloroform | 24.3 |
| Ethylene dichloride | 23.4 |
| Ethyl formate | 22.6 |
| Diethyl oxalate | 20.8 |
| Dimethyl carbonate | 19.8 |
| Trichlorethylene | 18.4 |
| Tetrachlorethylene | 15.2 |
| Acetone | >4 (Gives mostly high boilers). |

*Foot-note: Solvent boils too close to product to give good separation.

It is thus seen that the dibutyl ortho phthalate and the tricresyl phosphate used as solvents in the process, give yields of acetonedicarboxylic acid importantly superior to those obtained using any other solvents investigated by me, or in U.S. Pat. No. 3,773,821. The only other solvents in a similar yield class is dioxane, but this is carcinogenic (M. F. Argus et al., Hepato carcinogenicity of dioxine, J. Nat. Cancer Inst. 35, 949 (1965)) and low boiling. The importance of non-carcinogenicity is obvious and the high boiling point of the solvent is a great convenience in production, because it greatly facilitates the removal by distillation of low boiling constituents or reaction products and protects the desired product from the overheating which easily can occur if no higher fraction or solvent is present and the ratio of heating wall surface to total volume in the still increases as distillation proceeds.

I am using the name acetone dicarboxylic acid to include also its salts and low molecular alkyl esters such as methyl, ethyl, propyl and butyl esters. The differences in yield between our preferred solvents and all other solvents, except dioxane is sufficiently great to make the difference between an economical process, and one which cannot be seriously considered from the viewpoint of commercial production anywhere near today's price levels. The reaction steps 2 and 3 on a production basis, are almost quantitative, so that reaction 1 will determine the economical feasibility of the process.

Having thus disclosed my invention, I claim:

1. In the process for making citric acid in accordance with the equations

1. $COCl_2 + 2\ CO{=}CH + 2\ C_2H_5OH \rightarrow CO(CH_2COOC_2H_5)_2$

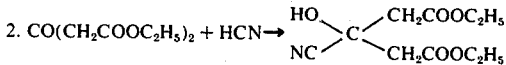

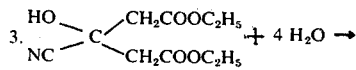

$HO.C_3H_4(COOH)_3 + NH_4Cl + 2\ C_2H_5OH$ the improvement which consists of reacting phosgene and ketene to form the intermediate acetonedicarboxylic acid, in a solvent selected from the class consisting of di-n-butyl - ortho-phthalate and tricresyl phosphates.

2. The improved process of claim 1 in which the said solvent is di-n-butyl-ortho-phthalate.

3. The improved process of claim 1 in which the said solvent is a tricresyl phosphate.

* * * * *